(12) United States Patent
Hatch

(10) Patent No.: US 7,116,994 B2
(45) Date of Patent: Oct. 3, 2006

(54) MOBILE NETWORK MESSAGE TO EMAIL REDIRECTION

(75) Inventor: Richard Hatch, Farnborough (GB)

(73) Assignee: Nokia Corporation, Espoo (FI)

( * ) Notice: Subject to any disclaimer, the term of this patent is extended or adjusted under 35 U.S.C. 154(b) by 604 days.

(21) Appl. No.: 10/023,699

(22) Filed: Dec. 21, 2001

(65) Prior Publication Data

US 2003/0119532 A1 Jun. 26, 2003

(51) Int. Cl.
H04Q 7/20 (2006.01)

(52) U.S. Cl. .................. 455/466; 455/412.2; 455/417; 455/414.1; 370/335; 370/349

(58) Field of Classification Search ................ 455/466, 455/412.2, 417, 414.1; 370/335, 349, 352
See application file for complete search history.

(56) References Cited

U.S. PATENT DOCUMENTS 6,061,572 A * 5/2000 Laiho .......................... 455/466
6,125,281 A * 9/2000 Wells et al. ................. 455/466
6,618,763 B1 * 9/2003 Steinberg ..................... 709/246
2002/0055350 A1 * 5/2002 Gupte et al. ................. 455/412
2003/0016639 A1 * 1/2003 Kransmo et al. ........... 370/335

FOREIGN PATENT DOCUMENTS

| EP | 0 835 021 A1 | 4/1998 |
| EP | 1 221 803 A1 | 7/2002 |
| GB | 2390956 A * | 1/2004 |
| WO | WO 97/33421 | 9/1997 |
| WO | WO 98 48560 | 10/1998 |
| WO | WO 00/54488 | 9/2000 |

* cited by examiner

Primary Examiner—Joseph Feild
Assistant Examiner—S. Smith
(74) Attorney, Agent, or Firm—Alston & Bird LLP

(57) ABSTRACT

A text message service to email gateway is provided so that text messages, or other information, in a mobile phone network can be selectively redirected to email addresses.

7 Claims, 2 Drawing Sheets

MOBILE NETWORK MESSAGE TO EMAIL REDIRECTION

FIELD OF THE INVENTION

The present invention relates to a communication system in which text messages in a mobile phone network are selectively redirected to email addresses.

BACKGROUND TO THE INVENTION

Mobile phone systems differ from country to country and indeed within countries and a mobile phone that works in one area may not work in another.

If a mobile phone user travels to an area where their mobile phone does not work, for instance a European traveling to Japan or South Korea, the user is unable to receive text messages.

SUMMARY OF THE INVENTION

The present invention provides means by which a user can receive mobile phone network text messages even though they are in an area where their mobile phone does not work.

According to the present invention, there is provided a method of operating a mobile phone network, the method comprising the steps of:

recording an email address in association with a mobile phone number;

receiving a signal, for example a text message, addressed to said number;

converting the text message into an email addressed to said email address; and sending the email.

Consequently, a mobile phone network subscriber can receive his or her text messages or other signals, even when they are in a region in which their mobile phone cannot be used. The present invention harnesses the fact that Internet connections are readily available in, so called, "Internet Cafes" and hotel business centers.

Preferably, a method according to the present invention includes receiving a redirect instruction associated with the mobile phone number. This instruction may be received from a subscriber in advance of the signal or generated after receipt of the signal and in dependence on a non-delivery criterion, for example non-delivery time or mobile station unreachable time, relating to the unavailability of a mobile station to receive said message.

Preferably, the signal is a text message and is received at a message service center, and the message service center obtains gateway address data from a database in dependence on the text message's destination address, the gateway address data identifying a text message to email gateway. More preferably, said gateway obtains said email address from a database in dependence on said text message's destination address.

According to the present invention, there is also provided a gateway apparatus for a mobile telephone network, the apparatus comprising:

text message receiving means for receiving a text message;

address obtaining means for obtaining an email address in dependence on a destination associated with a text message received by the text message receiving means; and email means for forming an email from the text in a text message received by the text message receiving means and sending it to the address obtained for it by the address obtaining means.

The gateway apparatus may be used in combination with a database storing a mapping of text message destinations onto email addresses, in which case the address obtaining means is configured to obtain email addresses from said mapping in said database.

DETAILED DESCRIPTION OF THE PREFERRED EMBODIMENT

A preferred embodiment of the present invention will now be described, by way of example, with reference to the accompanying drawings.

The details of GSM (Global System for Mobile Communications) are well known to workers in the field and are described in Mouly, M, and Pautet, M-B, "The GSM System for Mobile Communications", ISBN 2-9507190-0-7.

Figure 1:
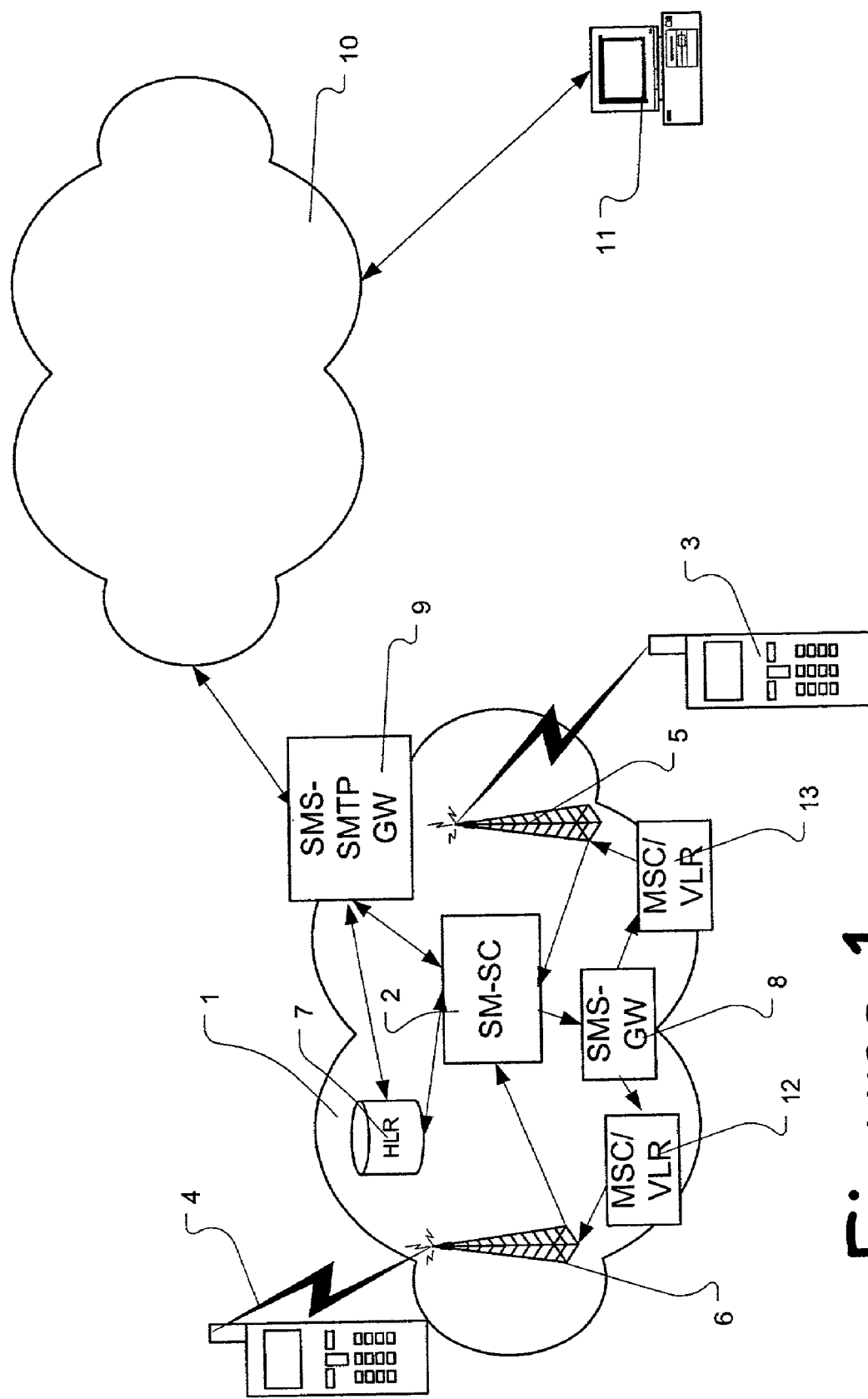
FIG. 1 shows a network system in which the present invention is implemented.

Referring to FIG. 1, a GSM mobile phone network 1 includes, inter alia, a short message service center 2, first and second mobile phones 3, 4, first and second base transceiver stations 5, 6, a home location register 7, an SMS gateway 8 and first and second mobile switching centers 11, 12. The mobile phones 3, 4 can send and receive text ("SMS") messages via the base transceiver station 4, the short message service center 2, the SMS gateway 8 and the mobile swiching centers 12, 13. For instance, the first mobile phone 3 can send a text message to the second mobile phone 4.

The short message service center 2 is also connected to an SMS-SMTP (simple mail transport protocol) gateway 9 which is itself connected to a data network 10, preferably comprising the Internet. A computer 11 is also connected to the data network 10.

Considering now the case of the user of the first mobile phone 3, if the user determined that she will be out of the coverage of any networks compatible with her mobile phone 3, she contacts the operator of the mobile phone network and informs that network operator of the period during which her mobile phone 3 will not be usable, or at least the start time and date, and an email address to which text messages for her should be sent. This information may be provided in a telephone call or text message, via a WAP site or Web site. If the network operator already has the email address, the redirection could be started by entering a predetermined code using the keypad of the first mobile phone 3.

On receiving this information, the network operator sets the SMS gateway field for the user to refer to the SMS-SMTP gateway 9, rather than the SMS gateway 8 and stores the redirection email address in a field of the user's record in the home location register 7.

On receiving an SMS message for the first mobile phone 3, for example from the second mobile phone 4, the short message service center 2 queries the home location register 7 for the SMS gateway for the user of the first mobile phone 3. Normally this will be that of the SMS gateway 8. However, if the user of the first mobile phone 3 has informed the network operator that text message forwarding by email is to be enabled, the home location register 7 will return an address for the SMS-SMTP gateway 9. The short message service center 2 forwards the message to the gateway identified by the home location register.

Figure 2:
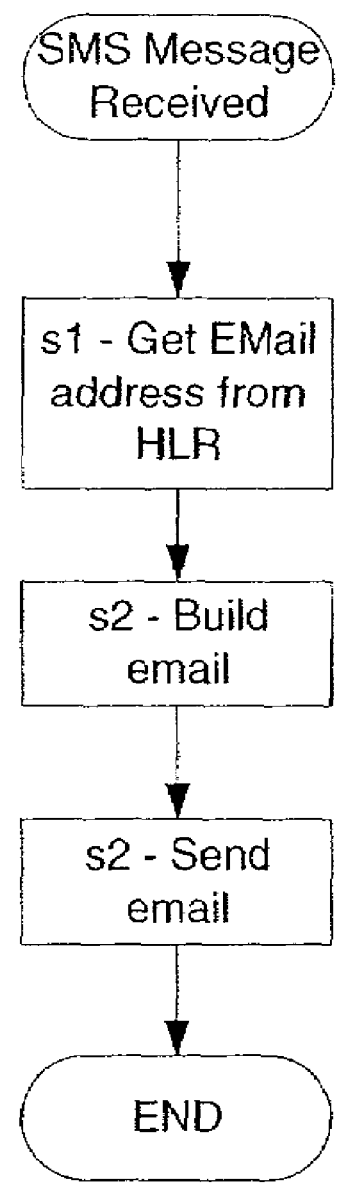
FIG. 2 is a flowchart illustrating the operation of a gateway according to the present invention.

Referring to FIG. 2, if the message is forwarded to the SMS-SMTP gateway 9, the SMS-SMTP gateway 9 queries the home location register 7 for the email address provided by the user of the first mobile phone 3 (step s1). The SMS-SMTP gateway 9 then incorporates the text of the text message into an email message with the address from the home location register 7 (step s2) and then sends it via the data network 10 using SMTP to its destination, i.e. the computer 11. The email produced has the sending party's mobile phone number in a "from" field of the message data.

The user of the first mobile phone 3 now has access to her email on the computer 11 using, for example, a POP3 or IMAP client or a webmail service.

In a second embodiment, the routing of a text message to the receiving party's email account it effected if the network does not detect the receiving party's mobile phone for a predetermined period. In this example, a subscriber does not need to notify his network operator when text messages for him are to be forwarded to email.

The case of a text message for the user of the first mobile phone 3 while the first mobile phone 3 is unreachable for an extended period will now be described.

Referring again to FIG. 1, on receiving an SMS message for the first mobile phone 3, for example from the second mobile phone 4, the short message service center 2 queries the home location register 7 for the SMS gateway for the user of the first mobile phone 3. If the home location register 7 is aware that the first mobile phone 3 is unreachable, it adds the short message service center 2 to a list of short message service centers with undelivered text messages for the first mobile phone 3.

If the home location register 7 is unaware that the first mobile phone 3 is unreachable, it returns routing information to the short message service gateway 2. The short message service center 2 then attempts to send the message via the SMS gateway 8 and the second mobile switching center 13, which was recorded in the home location register 7 as servicing the first mobile phone 3. In the present case, the second mobile switching center 13 will of course fail to deliver the message and will send an error report back to the SMS gateway 8 which in turn sends an error message to the short message service center 2 and a set message waiting message to the home location register 7. The message waiting state is mirrored in the visitors location register at the second mobile switching center 13 and the short message service center 2 is added to the home location register's list of short message service centers with undelivered text messages for the first mobile phone 3.

If the message waiting state is not removed within a predetermined period, for example 24 hours, by the first mobile station 3 becoming reachable again and the subsequent delivery of the waiting message or messages, a pseudo mobile station present message is generated at the home location register. The pseudo mobile station present message causes the home location register 7 to send an alert service center message to the short message service centers in the list of short message service centers with undelivered messages for the first mobile phone. This message causes, in the present example, the short message service center 2 to route the text message for the first mobile phone 3 to the SMS-SMTP gateway 9 which then operates as described with reference to FIG. 2.

It will be appreciated that many modifications may be made to the described preferred embodiment without departing from the spirit and scope of the claims appended hereto. For instance, the SMS-SMTP gateway could add an email address for the sender provided by an email to SMS gateway service in a reply-to header for the email sent via the data network. This would help the recipient respond to the sender with a message that will be delivered as a text message.

Furthermore, when a mobile station re-registers with the network, the network could send a text message containing a summary of the messages forwarded by email.

The redirection via email service, described above, may be used to forward other communications addressed to an unavailable mobile station. For instance, the redirection service can send image files, audio files, voice messages and other forms of information to a user-specified email address when the user's mobile station is unreachable by the network. That is to say, using services such as MMS, images and other forms of data sent from an originator to a recipient's mobile station can be transmitted to a given email address associated with the mobile station's number when the mobile station is out of reach of the network.

It will be appreciated that many modifications may be made to the embodiments described above without departing from the spirit and scope of the claims appended hereto.

The invention claimed is:

1. A system for a mobile telephone network, the system comprising:
   a text message receiving means for receiving over the mobile telephone network a text message sent to a mobile telephone network destination address;
   a redirect information means for receiving and storing a text message redirect instruction associated with one of the mobile telephone network destination addresses;
   a database for storing a mapping of the mobile telephone network destination addresses onto data network destination addresses in a data network;
   an address obtaining means for obtaining a data network destination address from said mapping in said database in dependence on the mobile telephone network destination address of a text message received by the text message receiving means; and
   an email means for forming an email from the text in a text message received by the text message receiving means in dependence on redirect information received in advance of the text message in the redirect information means, and sending the email over the data network to the data network destination address obtained for the email by the address obtaining means.

2. A system according to claim 1, wherein the text message is a fixed length message.

3. A system according to claim 1, wherein the redirect information is received from a subscriber.

4. A system according to claim 1, wherein the redirect information includes a time period for which the text messages are to be converted into email messages and delivered over the data network.

5. A system according to claim 1, further comprising a portable radio telephone for communicating in the mobile telephone network.

6. A portable radio telephone for communicating in the mobile telephone network as claimed in claim 1.

7. A method of controlling a mobile telephone network having a plurality of redirection states but only capable of being in one redirection state for a specific destination address at any one time, the method comprising:
- receiving a text message sent to a mobile telephone network destination address;
- determining the redirection state of the mobile telephone network associated with the mobile telephone network destination address; and
- in dependence upon the redirection state, performing one of:
  - sending the text message to the mobile telephone network destination address; or
  - converting the text message to an email message and sending the email message over a data network to a data network destination address associated with the mobile telephone network destination address.

* * * * *